(12) United States Patent
Allen et al.

(10) Patent No.: US 6,412,616 B1
(45) Date of Patent: Jul. 2, 2002

(54) ENERGY DISSIPATION SYSTEM

(75) Inventors: Noel L. Allen; Allen L. Arndt, both of Burnsville; Robert J. Monson, St. Paul, all of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/507,653

(22) Filed: Feb. 22, 2000

(51) Int. Cl.⁷ .................................................. F16F 9/02
(52) U.S. Cl. ........................................ 188/301; 267/119
(58) Field of Search ................................ 188/301, 318, 188/322.21; 267/119, 130, 34, 64.11, 64.28, 136, 140.11

(56) References Cited

U.S. PATENT DOCUMENTS

| | | | |
|---|---|---|---|
| 3,991,570 A | | 11/1976 | Keller |
| 4,229,965 A | * | 10/1980 | Spacek et al. ............ 72/453.13 |
| 4,693,454 A | * | 9/1987 | Tsuchiya et al. ............ 267/226 |
| 4,960,291 A | * | 10/1990 | Lin .............................. 280/710 |
| 4,986,383 A | * | 1/1991 | Evans ........................ 180/165 |
| 5,069,317 A | | 12/1991 | Stoll et al. |
| 5,076,404 A | * | 12/1991 | Gustafsson ................. 188/314 |
| 5,083,489 A | * | 1/1992 | Tidland et al. ................ 83/503 |
| 5,100,113 A | * | 3/1992 | Imanishi ..................... 267/119 |
| 5,437,436 A | * | 8/1995 | Holson et al. .............. 267/119 |
| 5,588,641 A | * | 12/1996 | Sand ........................... 267/119 |
| 6,050,558 A | * | 4/2000 | Agra ........................... 267/186 |
| 6,129,385 A | * | 10/2000 | Blackadder ................. 280/805 |
| 6,131,497 A | * | 10/2000 | Horde ....................... 83/639.5 |

* cited by examiner

Primary Examiner—Christopher P. Schwartz
Assistant Examiner—Xuan Lan Nguyen
(74) Attorney, Agent, or Firm—Patrick M. Hogan; Glenn W. Bowen

(57) ABSTRACT

An energy dissipation system for limiting forces applied to object; includes a piston rod that extends out of a pneumatic cylinder which contacts the object, the piston rod is forced from its initial position against a return spring and air is forced into an air line. The force transmitted to the object is consumed by an energy transformation device that responds to the air in the air line. [One such energy transformation device as an air accumulator, which is coupled to the air line trough a check valve. An orifice or release valve, releases air up a predetermined flow rate so that the linear motion of the protected object is transformed into work, which is dissipated.] [Another] The energy transformation device consists of an air-driven motor coupled to a heavy flywheel [through] that is driven by the motor. [A third alternative energy transformation device consist of a second dissipation cylinder and piston, where the dissipation cylinder is coupled to the air line so that the air in line, drives the pistons against a return spring that orifice or release valve, may also be coupled to the airline on to the dissipation cylinder.]

1 Claim, 1 Drawing Sheet

ENERGY DISSIPATION SYSTEM

BACKGROUND OF THE INVENTION

1. Field of the Invention

This invention is for an energy dissipation system, particularly one which utilizes a piston in a pneumatic cylinder to absorb a shock and to supply air to an air-operated energy dissipation device.

2. Description of the Related Art (a) A pneumatic shock absorber with a piston rod that extends out of the cylinder, showing on U.S. Pat. No. 5,069,317 issued Dec. 3, 1991 entitled "Numeric Shock Absorber" and invented by Kurt Stoll, et. al. This pneumatic shock absorber of the Stoll patent, however, requires a relatively complex structure and a source of compressed air coupled to the shock absorber. A valve system is also required in the shock absorber, which in conjunction with the compressed air controls the adapting characteristics of the shock absorber. The present invention by contrast, employs a piston and pneumatic cylinder with a spring return; therefore, there is no necessity of providing an external source of compressed air.

(b) U.S. Pat. No. 3,991,570 issued Nov. 16, 1976 to James E. Keller, entitled "Hydraulic Accumulator Pressure Release Valve and System" shows a hydraulic power supply unit. The unit is a closed system in which hydraulic fluid passes through a pressure release valve where the pressure relief valve automatically operates to release system pressure when the hydraulic pump of the system stops. When the pump is operating, fluid flows through a fluid supply line and a check valve to an accumulator. The accumulator helps to maintain the system pressure under a desired level. When the pump stops, the pressure relief valve relieves the accumulator pressure and the system pressure. The accumulator pressure and relieve valve of system in the Keller patent, however, is not associated with the elimination of a shock applied to a load by the employment of an air-operated energy dissipation device.

SUMMARY OF THE INVENTION

The motion of a computer, or other load, that must be protected from shock, compresses air in a pneumatic cylinder by driving a piston from an initial position against a return spring. Air is driven from the cylinder into an air line. The air pressure is used by air-operated energy dissipation devices to dissipate the energy generated by the computer cabinet or other load.

BRIEF DESCRIPTION OF THE DRAWINGS

The invention is showing by reference to the drawings in which.

DETAILED DESCRIPTION OF THE PREFERRED EMBODIMENT

Figure 1:
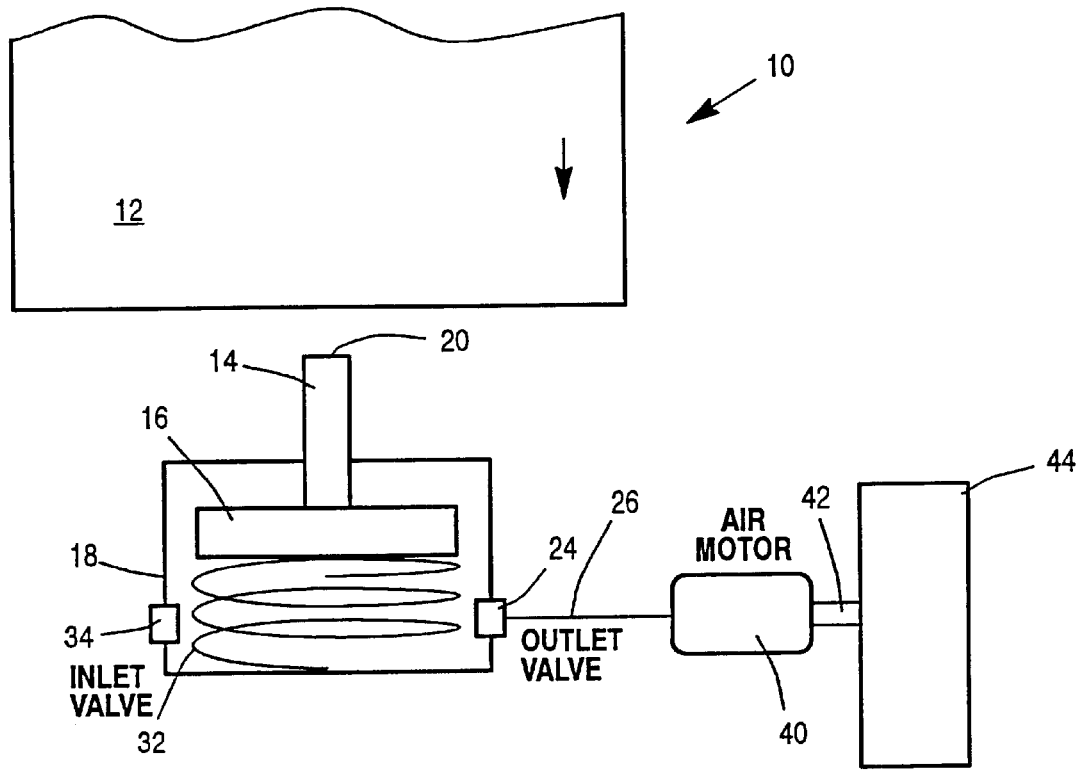
FIG. 1 is a diagrammatic representation of an embodiment of the invention which utilizes an air motor to dissipate energy.

The energy reduction system of this invention is intended to dissipate forces applied to loads and, in particular, forces that affect sensitive objects such as electronic equipment. The system does not require the utilization of any hydraulic fluids, or any external compressed air sources. The system is able to dissipate energy quickly when the object to which the shock force is applied and is driven into contact with the piston rod of a pneumatic cylinder.

FIG. 1 illustrates an embodiment of the energy reduction system of the present invention. In this embodiment, the energy reduction system 10 is positioned adjacent to a load, such as a computer cabinet 12, or other type of load that must be protected from shock. The computer cabinet is located just above the extending piston rod 14 of a piston 16 in a cylinder 18 with a vent 34. The cylinder 18 is preferably shaped in the form of a "pancake" or as a relatively flat shape with a horizontal dimension that is appreciably larger than its vertical dimension. When a sudden download force is applied to the computer cabinet 12, it is driven downward into contact with the upper end 20 of the piston rod 14 of the piston 16. As the piston 16 is driven downward by the cabinet, it compresses the air below it, forcing an outlet valve 24 to open. This enables air to be forced into their line 26 to the air motor 40, which drives the motor shaft 42 and the fly wheel 44, to translate the energy supplied to the flywheel by the cabinet displacement 12 into rotation of the flywheel.

What is claimed is:

1. An energy dissipation system for reducing the energy of a shock force applied to an object which is moved in a given direction in response to the shock force comprising:

(a) a shock absorber which comprises a pneumatic cylinder;

(b) a piston in said cylinder which has a piston rod end that extends out of the cylinder so that said piston rod end is contacted by said object during its motion;

(c) a return spring located in said cylinder for returning said piston to its initial position after the shock force on said object has been dissipated;

(d) an outlet valve in said cylinder which allows for the passage of air outwardly from said cylinder when said piston is forced toward said outlet valve;

(e) an air line coupled to receive air from said outlet valve in said air line;

(f) an air-operated motor device comprising a rotary shaft coupled to receive air from said air line, and constructed to drive said shaft in a rotary motion when said air-operated motor receives air from said air line; and (g) a flywheel coupled to said shaft for translating the energy of said air into rotation of said flywheel.

* * * * *